C. V. EMMONS.
INSOLE.
APPLICATION FILED JAN. 22, 1913.
1,065,035.
Patented June 17, 1913.
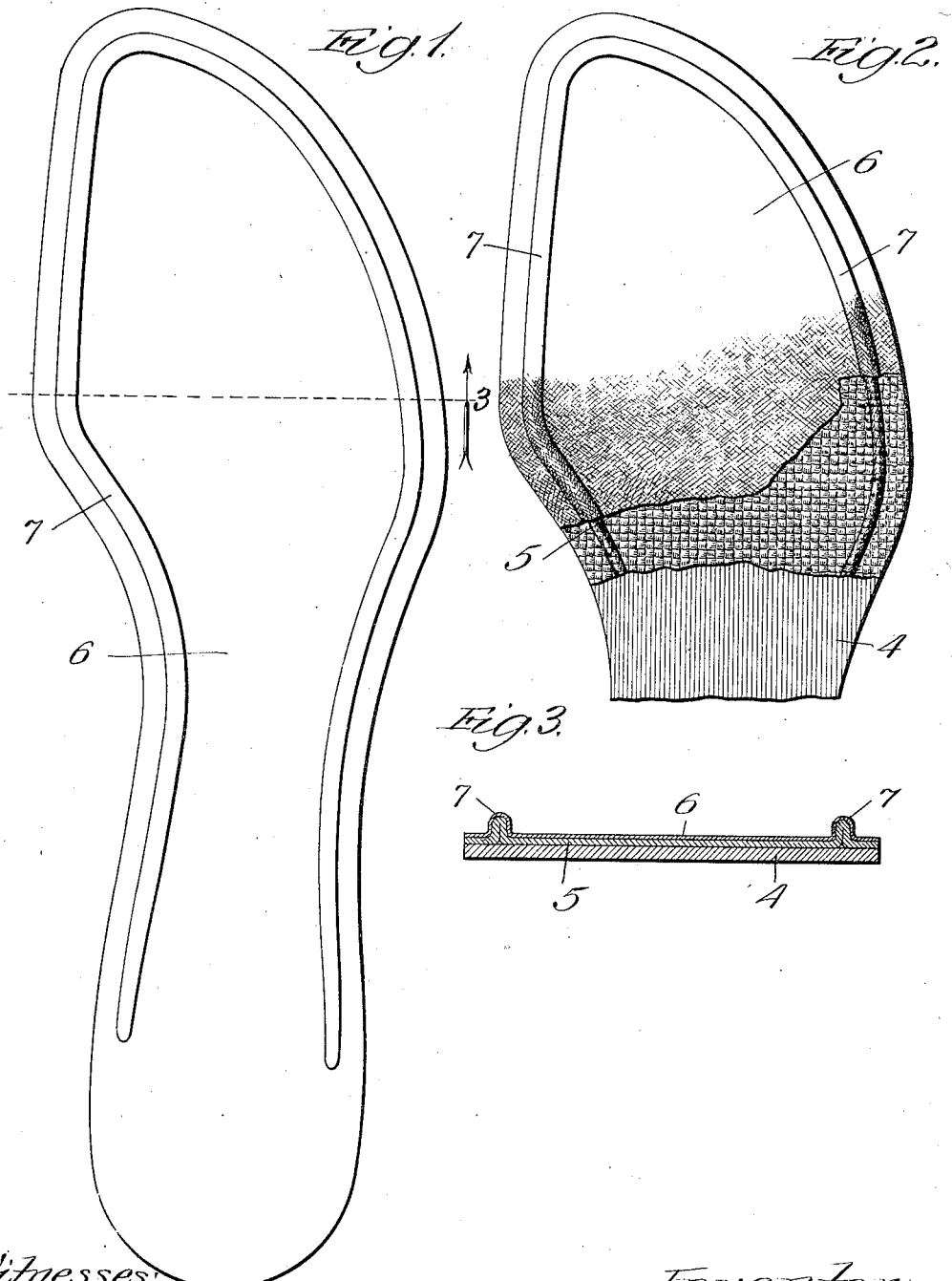
Witnesses:
Inventor.
Charles V. Emmons,

UNITED STATES PATENT OFFICE.

CHARLES V. EMMONS, OF CHICAGO, ILLINOIS.

INSOLE.

1,065,035.   Specification of Letters Patent.   Patented June 17, 1913.

Application filed January 22, 1913. Serial No. 743,466.

*To all whom it may concern:*

Be it known that I, CHARLES V. EMMONS, a citizen of the United States, residing at Chicago, in the county of Cook and State of Illinois, have invented a new and useful Improvement in Insoles, of which the following is a specification.

My invention relates to an improvement in the construction of the feature of an insole known as the "lip," through which the welt is sewed in place.

The object of my invention is to cheapen the construction of the insole by simplifying that of the lip, and this without mutilating the leather body, as is done by the ordinary method of forming the lip, namely by cutting into the side edges and about the toe-portion of the body to form thereon an attached strip of about one-fourth of an inch in width, and then turning or "curling" that strip to a right-angle and covering the face of the leather body with canvas cemented to it and clenched about the lip so formed to conform to and reinforce the latter.

I accomplish the aforesaid object by the construction hereinafter described and illustrated in the accompanying drawing, in which—

Figure 1 is a plan view of my improved insole; Fig. 2 is a broken plan view of the same, disclosing the features of my improved construction, and Fig. 3 is a section on line 3, Fig. 1.

The leather body-portion 4 is like that of the ordinary insole, except that it is unmutilated, being devoid of the usual integral lip. As the insole-covering, I provide a layer 5 of fabric, preferably burlap of thin quality, and a layer of more closely woven fabric 6, preferably canvas, conforming in shape to that of the body 4. These layers are cemented flatwise together and placed in a suitable mold to form upon them, by preference while pressing them together and drying the cement, the ridgelike lip 7; and the covering thus formed is cemented, at the burlap-layer, to the surface of the leather body 4. In this way, I provide the necessary insole-lip without mutilating the leather body, which not only saves weakening it but avoids a comparatively expensive operation, for which I substitute the molding of the lip on two thicknesses of covering, thereby adding to the ordinary insole-construction one layer of inexpensive material and cementing them together by a simple and inexpensive lip-molding operation.

I am aware that it is old to form the lip, by molding, on a single piece of canvas cemented to the surface of a leather body 4; but that construction fails to secure the canvas covering, by cementation, durably to the leather, because the canvas is insufficiently porous to absorb enough of the cement for the purpose. By providing the under layer 5 of loosely woven material, such as burlap, which is very porous, it absorbs a sufficiently large amount of cement to cause enduring cementation of the lip-carrying fabric-covering to the leather; and this aside from the additional advantage of the double thickness of fabric in reinforcing the lip to cause it to stand up rigidly, while the lip formed with a single layer of canvas fails in that regard.

What I claim as new and desire to secure by Letters Patent is—

An insole comprising a body-portion and two layers respectively of coarsely-woven fabric and finely-woven fabric cemented together and formed with a lip composed of the two thicknesses of fabric, said layers forming a covering cemented at the under layer of coarsely-woven fabric to a surface of said body-portion.

CHARLES V. EMMONS.

In presence of—
A. C. FISCHER,
NELLIE B. DEARBORN.